UNITED STATES PATENT OFFICE.

FRANK THATCHER, OF EL PASO, TEXAS, ASSIGNOR OF ONE-HALF TO LUTHER M. STILES, OF HACHITA, NEW MEXICO.

PROCESS OF MAKING ALCOHOL.

1,096,965.

Specification of Letters Patent. Patented May 19, 1914.

No Drawing.

Application filed June 28, 1913. Serial No. 776,311.

*To all whom it may concern:*

Be it known that I, FRANK THATCHER, a citizen of the United States, residing at El Paso, in the county of El Paso and State of Texas, have invented new and useful Improvements in Processes of Making Alcohol, of which the following is a specification.

This invention relates to a process of making alcohol from sotol (*Dasylirion Wheeleri*) and the other species of cacti, including nopal (prickly pear), opuntia, cholla, Sechugilla, (*Agave lechuguilla*), *Cereus giganteus*, *Echinocactus breovhomotus*, etc.

The object of the invention is to provide a process whereby alcohol may be economically produced from plants of this character not hitherto utilized or capable of utilization under prior processes.

In carrying my invention into practice, the sotol or other selected cactus material is disintegrated or ground in a suitable machine, after which it is transferred to a digester. To the mass of cactus material is then added a certain amount of water, and the moistened or saturated mass is then subjected while under constant agitation to the action of super-heated steam at predetermined temperatures for the extraction of deleterious substances for a period of about two hours, during which time the temperature of the steam may be varied at the will of the operator within certain limits, until such deleterious substances are freed for discharge and the treatment of the material for the formation of fermentable sugars is completed. After the material has been treated until the saccharin carrying substances are broken down and such substances in condition for fermentation, the deleterious substances referred to are discharged from the digester. The cactus material, which is in a pulpy state, is then removed from the digester and the liquid expressed therefrom in a suitable press, after which the liquid is passed through cooling coils, by which its temperature is reduced to a desired low degree. The cooled liquor is then placed into suitable fermenting tubs at a temperature most desirable for fermentation, and during the period of fermentation a special prepared yeast is added in sufficient quantities to cause and permit active fermentation. After fermentation is completed, the material is distilled in the ordinary way, the alcohol vapors being condensed and the alcohol run into suitable receptacles, while the solid residue is pressed and ground for use as a cattle food in either a solid or meal form. This food product is one which is eaten with avidity by cattle and constitutes a wholesome and nutritious article of diet.

All species of cactus contain more or less formic acid, which is destructive to ordinary yeast, and the purpose of adding water to the ground material and subjecting the same in a digester to the action of super-heated steam is, in addition to placing the material in condition for fermentation, to extract from the material as much of the formic acid as possible. In practice, an amount of water equal to the weight of the material in the digester is added thereto, that is to say, about one ton or 240 gallons of water to each ton of the disintegrated and ground material, and while the agitators in the digester are kept in constant motion, the temperature of the mass is gradually raised under action of the super-heated steam until the temperature reaches about 275° F. This treatment is carried out for a period of about two hours, which is ordinarily sufficient to place the material in condition for subsequent treatment, and at this time a valve in the top of the digester is opened, allowing the steam to blow out, carrying with it the extracted formic acid, whereby most of the formic acid is removed. The mass remaining in the digester at this stage is in the form of a pulp, which is removed from the digester and passed through a suitable press, whereby the liquid is extracted. The liquid is then passed through cooling coils and is cooled down to a temperature of about 86° F., at which temperature it is passed into the fermenting tub. To the liquid is then added the special prepared yeast, which is made from a pure culture of *Saccharomyces cerevisiæ*. In the preparation of the yeast mash equal parts of ground rye and malt are used, to which is added ammonium phosphate, in the proportion of one part of ammonium phosphate to each 1000 parts, by weight of the liquid to be fermented. The ammonium phosphate furnishes yeast food and provides for a vigorous growth, thereby overcoming the deleterious influence of the minute quantities of formic acid remaining in the material and promoting fermentation, which is usually completed in about 72 hours. The fermented liquor is then distilled and the alcohol recovered, as hereinbefore described. By means of this process alcohol may be economically produced from plants of the character described not hitherto utilized or capable of being utilized under prior processes.

It will of course, be understood that while the exact mode of treatment defined is preferred, the invention is not limited strictly thereto, as departures may be made as circumstances require. For instance, while an amount of water equal in weight to the ground material is generally used during the process of digestion, more or less water may be used according to the condition of the material to its specific characteristics. The temperature of the super-heated steam may also vary to accord with varying conditions, the temperature usually ranging from 250° F. to 275° F., the heating of the material between these temperatures being practically essential. The improvement of relieving the material from as much formic acid as possible and rendering the formic acid innocuous in the process of fermentation will be obvious.

Practical experience has shown that the species of cactus known as sotol (*Dasylirion Wheeleri*) is more readily responsive to the process and yields a larger amount of alcohol, and is more desirable for use in residual form as a cattle food, than the other species of cacti named, but the process will be found effective for the production of alcohol from any species of cacti.

What is claimed is:—

1. The herein described process of producing alcohol from cacti, which consists in subjecting the comminuted cacti, with an added amount of water, while under agitation in a digester to the action of super-heated steam, blowing off the steam with the extracted formic acid ordinarily present in the cacti, expressing the liquid from the mass, subjecting the same to fermentation in the presence of a yeast capable of producing alcoholic fermentation in the presence of the remaining minute quantities of formic acid, and then distilling the fermented liquid.

2. The herein described process of producing alcohol from cacti, which consists in first subjecting the comminuted cacti, in an added amount of water, to the action of superheated steam at a temperature of from 250 to 275° F., in a digester while under agitation, blowing off the steam with the extracted formic acid ordinarily present in the cacti, expressing the liquid from the mass, subjecting the same to fermentation in the presence of a yeast capable of producing alcoholic fermentation in the presence of the remaining minute quantities of formic acid, and then distilling the fermented liquid.

3. The herein described process of producing alcohol from cacti, which consists in first comminuting the cacti, then subjecting the same with an added amount of water in a digester while under agitation to the action of super-heated steam at a temperature of from 250 to 275° F., then blowing off the steam with the extracted formic acid ordinarily present in the cacti, and then expressing the liquid from the mass, then subjecting the material to fermentation in the presence of a yeast and ammonium phosphate, and then distilling the fermented liquid.

In testimony whereof I affix my signature in presence of two witnesses.

FRANK THATCHER.

Witnesses:
F. W. BEHR,
EDWIN W. MILLER.